No. 765,082. PATENTED JULY 12, 1904.
I. KITSEE.
SECONDARY BATTERY.
APPLICATION FILED AUG. 9, 1902.
NO MODEL. 2 SHEETS—SHEET 1.
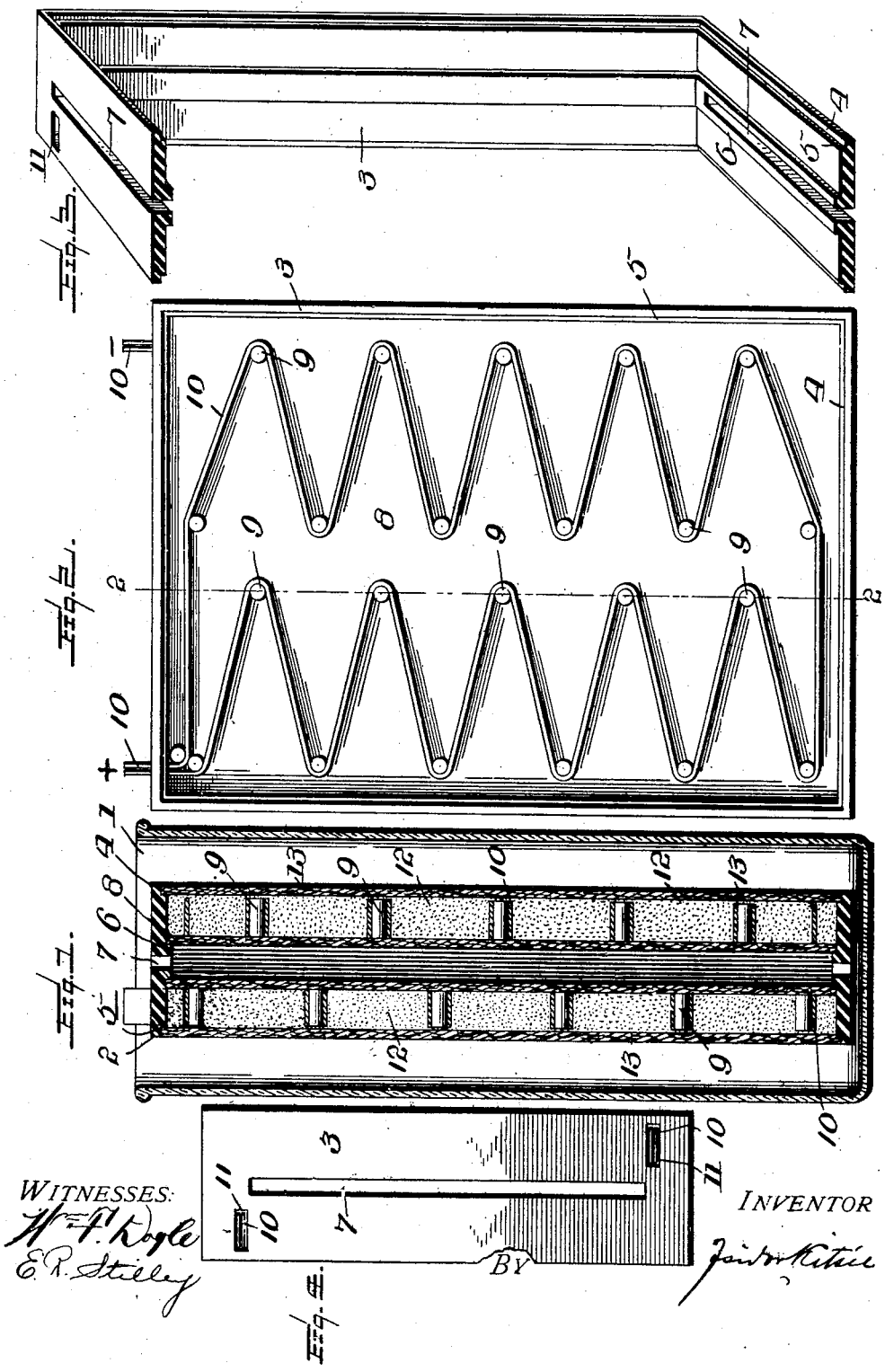
WITNESSES:
INVENTOR
BY No. 765,082. PATENTED JULY 12, 1904.
I. KITSEE.
SECONDARY BATTERY.
APPLICATION FILED AUG. 9, 1902.
NO MODEL. 2 SHEETS—SHEET 2.
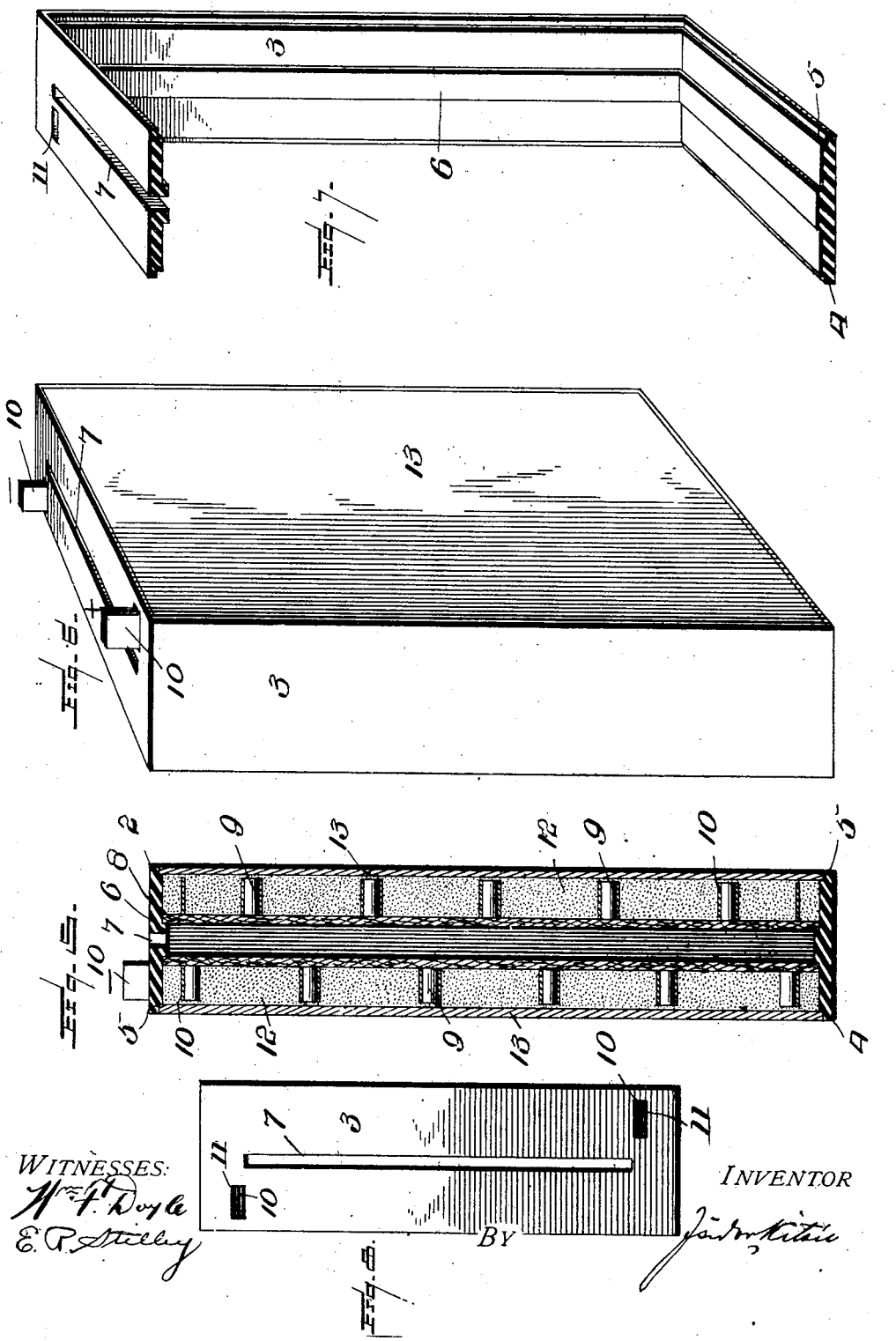
WITNESSES: INVENTOR No. 765,082.

Patented July 12, 1904.

UNITED STATES PATENT OFFICE.

ISIDOR KITSEE, OF PHILADELPHIA, PENNSYLVANIA.

STORAGE BATTERY.

SPECIFICATION forming part of Letters Patent No. 765,082, dated July 12, 1904.

Application filed August 9, 1902. Serial No. 119,074. (No model.)

*To all whom it may concern:*

Be it known that I, ISIDOR KITSEE, a citizen of the United States, residing at Philadelphia, in the county of Philadelphia and State of Pennsylvania, have invented certain new and useful Improvements in Storage Batteries, of which the following is a specification.

This invention relates to improvements in electrical accumulators, or, as more commonly known, "storage batteries."

In that class of batteries wherein the electrodes are formed of lead plates to which is applied a suitable coating of active material, usually oxid of lead, it is a well-known fact that the exposed surfaces of the lead become in time unduly brittle and warped, and, moreover, it is also a well-known fact that batteries of the class referred to are extremely cumbersome and heavy and that their capacity is comparatively small in proportion to their great weight.

It is therefore the object of the present invention to provide a storage battery the construction of which is such as to effectually overcome the objectionable features above noted and one which is of large capacity, but at the same time much lighter in proportion to its capacity than the batteries now generally in use.

With these general objects in view and others which will appear as the nature of the improvements is better understood the invention consists, substantially, in the novel construction, combination, and arrangement of parts as will be hereinafter fully described, illustrated in the accompanying drawings, and pointed out in the appended claims.

In the drawings, Figure 1 is a vertical transverse sectional view of a battery constructed in accordance with the present invention and adapted for use with the usual containing-jar, the section being taken on the line 2 2, Fig. 2. Fig. 2 is a side elevation of the battery removed from the containing-jar, the side cover and the active material being removed. Fig. 3 is a sectional perspective view of the frame of the battery. Fig. 4 is a top plan view of the battery. Fig. 5 is a vertical transverse sectional view of another form of the battery adapted for use without the usual containing-jar. Fig. 6 is a perspective view thereof. Fig. 7 is a sectional perspective view of the frame of the form shown in Figs. 5 and 6, and Fig. 8 is a top plan view of such form.

Referring to the drawings, the numeral 1 designates the usual containing jar or vessel of a storage battery; but as this does not enter into the present invention it is sufficient to state that the same may be of any desired construction and form.

Arranged within the containing jar or vessel 1 is a cell 2, and said cell comprises a frame 3, which is substantially rectangular in form. The frame 3 is preferably formed of hard rubber or other material which will not be attacked by the electrolyte within the containing jar or vessel, and said frame is provided at each of its edges and extending entirely around the same with a rabbeted portion 4, through the medium of which a shoulder 5 is formed at such edges. The frame 3 is also provided at its central portion and extending entirely around the same with an internal flange or bead 6, said flange or bead at the top and bottom portions of the frame being provided with a slot 7. The slots 7 register with each other and extend substantially the full width of the frame 3, and through the medium of the slots 7 the electrolyte within the containing jar or vessel is adapted to enter within the frame 3 in order to fill the interior thereof, as will appear more fully hereinafter.

Arranged within the frame 3 at the sides of the flange or bead 6 and fitting snugly thereagainst is a pair of supporting-plates 8, and said plates are formed of porous material in order that the electrolyte confined within the area between said plates when the cell is placed within the containing jar or vessel 1 may be absorbed by said plates and passed therethrough. The plates 8 are also provided at their outer faces with a series of outwardly-projecting pins 9, said pins being arranged preferably in staggered relation in order to provide supports for a conductor 10. The conductor 10 is in the form of a thin strip, preferably of lead, and said conductor is wound about the pins 9 in a circuitous manner, as clearly shown in Fig. 2, and arranged on said pins in such manner that the outer edges of the strip will lie flush with the free ends of said pins. The ends of each strip 10 are projected through an opening 11 in the top of the frame 3, and said projecting ends provide terminals for the attachment of suitable conductors.

Surrounding the pins 9 and the conducting-strip 10 of each of the supports 8 is a body of active material 12, which may be oxid of lead, and said active material is packed around said pins and strip in such manner as to completely envelop the same, and in order that the active material may be held within the frame 3 and upon the plates 8 said frame is provided with removable covering-plates 13. The latter, as is the case with the plates 8, are formed of a porous material through which the electrolyte may readily pass in order to reach the active material; but it will be observed that the length of the pins 9 and the width of the strips 10 are not sufficient to contact with the inner sides of the plates 12. Hence a space remains between said plates and the extremities of the pins 9, which spaces are filled with the active material 12, as is clearly seen in Fig. 1.

In Figs. 5 to 8, inclusive, is shown another form of the battery, and this form is designed for use without the employment of the usual containing jar or vessel 1. The form shown in the figures referred to is precisely the same in all respects to the form shown in Figs. 1 to 4, inclusive, with the exception that in lieu of providing the bottom of the containing-frame 3 with a slot, as is the case in the form shown in Figs. 1 to 4, such slot is entirely omitted, so that the lower end of the frame remains closed. In this form the electrolyte is placed within the cell through the slot 7 at the upper end thereof and occupies the space between the supporting-plates 8, and it will also be observed that in lieu of forming the covering-plates 13 of porous material such plates are formed of a non-porous material. Consequently the electrolyte is precluded passing through the covering-plates, and hence leakage of the cell is entirely prevented.

It is obvious that in each of the forms of the invention shown one of the supporting-plates 8 and its pins 9 and conducting-strip 10 will form the positive electrode, while the other supporting-plate and its pins and conducting-strip will form the negative electrode, and by reason of the construction shown and described it is also obvious that a battery is provided which is comparatively light, but of great capacity, and one in which there are no exposed surfaces of lead to become in time unduly brittle and warped.

While the forms of the invention herein shown and described are what are believed to be preferable embodiments thereof, it will of course be understood that the same are susceptible of various changes in the form, proportion, and minor details of construction, and the right is therefore reserved to modify or vary the invention as falls within the spirit and scope thereof.

Having thus described my invention, what is claimed as new, and desired to be secured by Letters Patent, is—

1. A storage battery, comprising a containing-frame provided with an inlet for the electrolyte, a support arranged therein, a conductor carried by said support, and a body of active material confined within said frame and enveloping said conductor.

2. A storage battery, comprising a containing-frame, a support arranged therein, a series of pins carried by said support, a conductor carried by said pins, and a body of active material arranged within said frame and enveloping said conductor and pins.

3. A storage battery, comprising a containing-frame, said frame being provided with an internal flange or bead, supports arranged within said frame and fitting upon said flange or bead, conductors carried by said supports, and a body of active material confined within said frame and enveloping said conductors.

4. A storage battery, comprising a containing-frame, said frame being provided with an internal flange or bead having an inlet for the admission of the electrolyte, supports fitted upon said flange or bead and spaced from each other to provide a confined area for the electrolyte, conductors carried by said supports, and a body of active material confined within said frame and enveloping said conductors.

5. A storage battery, comprising a containing-frame, said frame being provided with an internal flange or bead and having an inlet for the admission of the electrolyte, supports fitted upon said flange or bead and spaced from each other to provide a confined area for the electrolyte, pins carried by said supports, conductors carried by said pins, and a body of active material confined within said frame and enveloping said pins and said conductors.

6. A storage battery, comprising a positive and negative electrode, both electrodes contained in one containing-frame provided with an inlet for the electrolyte, and a porous support for the conducting and active material for each of said electrodes.

7. A storage battery, comprising a positive and negative electrode, both contained in and supported by one common frame, conducting and active material for each of said electrodes, said conducting and active material confined in spaces formed by porous partitions arranged in said frame.

In testimony whereof I hereby sign my name, in the presence of two subscribing witnesses, this 5th day of August, A. D. 1902.

ISIDOR KITSEE.

Witnesses:
EDITH R. STILLEY,
WM. N. CORNWELL.